RECORDING AND/OR REPRODUCING APPARATUS

Filed April 4, 1960

Inventor
EARL R. HIBBARD
By Harvey S. Lowhurst
Atty 3,076,055

RECORDING AND/OR REPRODUCING APPARATUS

Earl R. Hibbard, Sunnyvale, Calif., assignor to Ampex Corporation, Redwood City, Calif., a corporation of California Filed Apr. 4, 1960, Ser. No. 19,610
7 Claims. (Cl. 178—6.6)

The present invention relates to a recording and/or reproducing apparatus and more particularly to a recording and/or reproducing apparatus which includes a system for obtaining a component signal from a reproduced signal which represents a composite signal.

In general, a recording/reproducing apparatus includes a reproducing medium, such as a magnetic tape, and a transducing means, such as a recording head, movable relative to the reproducing medium. An electrical signal to be recorded is applied to the transducing means and is thereby transferred to the recording medium as a reproducible change therein. When it is desired to reproduce a signal, the transducing means is moved relative to the recording medium at substantially the same speed as is employed in recording the signal. The reproducible change in the recording medium produces a signal at the transducing means, which signal is then amplified and processed for transmission.

One well-known recording/reproducing apparatus employs a relatively wide, longitudinally moving magnetic tape and a head assembly which rotates transversely of the tape. The head assembly includes four circumferentially spaced magnetic heads which sweep successively across the tape. Such apparatus is used extensively for recording/reproducing monochrome and color television signals.

The color and monochrome television systems, which are in general use in the United States, employ a composite waveform or signal which is made up of synchronization (sync) information to establish a raster for presenting the picture material in proper position in time and space, and picture luminance information. The color video signal additionally includes picture chroma information on a subcarrier and a signal for synchronizing the chroma picture material.

In a standard composite video signal the synchronization information occupies the upper 25 percent of the video signal's amplitude, and the picture luminance information occupies the lower 75 percent. The 75 percent level is called the pedestal level and is provided by blanking pulses in the composite video signal. The picture synchronization information is transmitted as a train of pulses which pulses are superimposed on the blanking pulses.

A frequency modulation system has been employed in recording/reproducing apparatus in order to record the video signal. In such an apparatus, a suitable carrier signal is frequency modulated by a composite video signal to be recorded, and the resulting frequency modulated (FM) carrier signal is applied to the recording head assembly whereby the signal is recorded on the magnetic tape.

In the reproducing mode, the reproduced frequency modulated carrier signal at the head assembly is applied through suitable switching circuits and amplifiers to a demodulating circuit. In the demodulating circuit, the frequency modulated carrier signal is converted into the video signal which had been recorded.

The reproduced composite video signal at the output of the demodulator is subject to noise from switching circuits, brushes on the head assembly, tape dropouts, cross talk, unfiltered carrier, etc. Such noise or extraneous pulses occurring at or above the blanking pulses of the reproduced video signal may cause improper operation of a television receiver, such as false horizontal synchronization, false vertical synchronization, etc. Also, any variations in the timing and rise time of the synchronization pulses may cause improper operation of the receiver. For example, variation in timing of the horizontal synchronization pulses causes tearing of the picture at the receiver.

In previously available recording/reproducing apparatus, noise has been removed from the reproduced composite video signal by applying the reproduced video signal to a processing amplifier. In the processing amplifier, the video signal is clamped and then the video signal is clipped at such an amplitude level that the blanking and synchronization pulses are separated from the remainder of the video signal. Regenerated blanking pulses are then reinserted in the remaining video signal. The synchronization pulses are stripped from the separated portion of the video signal with the aid of a gating circuit which opens slightly before the rise time of each synchronization pulse which closes slightly after the fall time of each synchronization pulse. The synchronization pulses are then reinserted in the video signal.

The composite video signal at the output of previously available processing amplifiers has been essentially noise-free and acceptable for transmission. However, the processing amplifiers have employed a great number of vacuum tubes and have been relatively complicated and hence difficult to maintain. In addition, spurious noise pulses have momentarily diabled clamping circuits in the processing amplifier and hence have impaired the conventional sync stripping action. Moreover, noise may occur in the output signal of the processing amplifier immediately before and after each synchronization pulse because the gating circuit provided therein opens slightly before, and closes slightly after each synchronization pulse. Furthermore, since the gating circuit is open during each synchronization pulse, noise may occur in the output signal of the processing amplifier during the synchronization pulse.

An object of the present invention is the provision of a recording and/or reproducing apparatus which includes a system for obtaining a component signal from a reproduced signal which represents a composite signal. Another object of the invention is the provision of a video recording and/or reproducing apparatus which includes a system for obtaining synchronization pulses from an FM carrier signal which represents a composite signal. A further object is the provision of a recording and/or reproducing apparatus which includes a system for obtaining synchronization pulses, which system is inexpensive to manufacture and relatively simple to maintain.

Other objects and advantages of the present invention will become apparent from the following description and accompanying drawings.

A recording and/or reproducing apparatus system in accordance with the present invention includes a recording medium having recorded thereon a carrier signal which has been frequency modulated by a composite signal, a component signal thereof being represented by a band of one or more frequencies in the frequency modulated carrier signal. Means are provided in the apparatus for reproducing the frequency modulated carrier signal. A system is provided in the apparatus for obtaining the component signal. The system includes means coupled to the output of the reproducing means for selecting the band of frequencies representing the component signal. Means are coupled to the output of the selecting means for detecting the amplitude variations in the output signal thereof, and means are provided for clipping the output signal of the detecting means.

For purposes of explanation, the invention is described hereinafter in connection with a magnetic tape recording/reproducing apparatus which is employed to record and/or reproduce a composite video signal.

Figure 1:
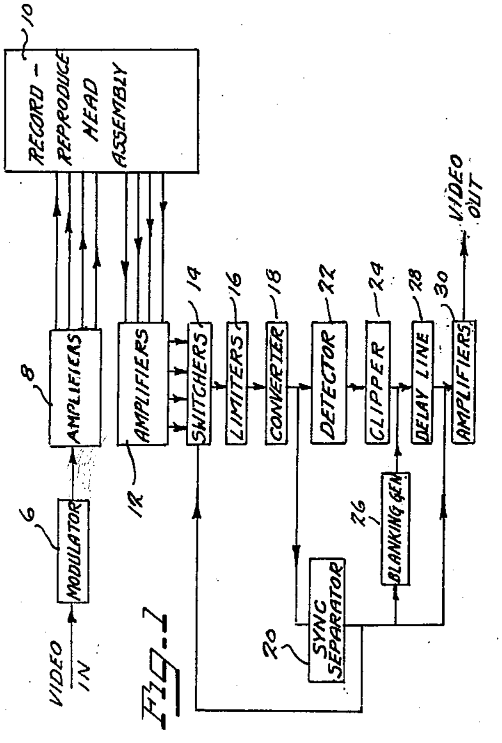
FIGURE 1 is a block diagram showing a video recording/reproducing apparatus showing various features of the present invention.

In the illustrated embodiment of FIGURE 1, a composite video signal, which includes synchronization pulses, is provided by a suitable source (not shown), such as a television camera. The composite video signal is applied to a standard modulator 6. In the modulator 6 the composite video signal is clamped at its pedestal level. The clamped composite video signal is then employed to modulate a carrier signal, the synchronization pulses reducing the frequency of the carrier signal and the picture luminance information increasing the frequency.

The synchronization pulses in a video signal are generally rectangular with a relatively fast rise and fall time. Hence, the tip of each synchronization pulse is represented by one frequency in the frequency modulated carrier and the rise and fall of each pulse by a plurality of frequencies. In the standard modulator employed in a conventional video recorder/reproducer, a carrier of 5.0 megacycles is varied by a standard video signal to 4.3 megacycles at the tip of each synchronization pulse and to approximately 6.8 megacycles at the white base line of the video signal. Thus it can be seen that each synchronization pulse is represented in the frequency modulated signal by a band of frequencies which range between approximately 4.3 megacycles and 5.0 megacycles.

As illustrated, the output of the modulator 6 is coupled through amplifiers 8 to a conventional record-reproduce head assembly 10. The head assembly 10 includes four circumferentially spaced magnetic heads (not shown) which sweep successively across a longitudinally moving magnetic tape (not shown) and hence the signal applied to the head assembly 10 is recorded on the tape.

The FM carrier signal, which is recorded on the magnetic tape, is reproduced in the conventional manner by the head assembly 10. As illustrated in FIGURE 1, the output of the head assembly 10 is connected to a standard amplifier or amplifiers 12 which, in turn, is coupled to a switcher 14. In the switcher 14, the outputs from the four heads of the head assembly 10 are suitably combined to provide a FM carrier signal which corresponds to the recorded FM carrier signal.

The output of the switcher 14 is coupled to standard limiters 16 which remove all amplitude modulation and AM noise which may be introduced in the FM carrier signal during recording and reproducing.

As illustrated, the output of the limiters 16 is coupled to a conventional converter 18. The converter 18 provides an AM/FM signal having an amplitude which varies in accordance with its frequency and a frequency which varies in accordance with the amplitude of the video signal. Thus, the composite video signal is represented in the AM/FM signal as amplitude variations and frequency variations of a carrier signal.

As shown in FIGURE 1, the output of the converter 18 is coupled to a sync separator 20 and a standard detector 22. As described hereinafter, the sync separator provides pulses at its output which correspond to the synchronization pulses in the recorded composite signal.

In the detector 22, the FM/AM signal is rectified and the carrier signal is eliminated from the resulting rectified signal. Thus, a composite video signal is provided at the output of the detector 22, which signal is generally similar to the recorded composite video signal.

The output of the detector 22 is coupled to a standard clipper 24 wherein the synchronization pulses together with the upper portion of the blanking pulses are removed from the video signal. New blanking pulses, which are generated by a conventional blanking generator 26, are inserted in the video signal at the output of the clipper 24. Thus, the video signal is provided with blanking pulses which are essentially noise free.

The output of the clipper 24 is coupled through a delay line 28, to a standard video amplifier 30, pulses from the output of the sync separator 20 being added to the video signal at the input of the amplifier 30. As hereinafter described, the delay line 28 is provided to delay the video signal in order that the pulses from the output of the sync separator 20 be accurately timed therewith.

In the illustrated embodiment, the pulses at the output of the sync separator 20 are applied to the blanking generator 26 to control the timing thereof. In addition, the output of the sync separator 20 is coupled to the switcher 14 to thereby control the switching time of the switcher 14 in the conventional manner. The pulses may also be used for various operations in the television studio.

Figure 2:
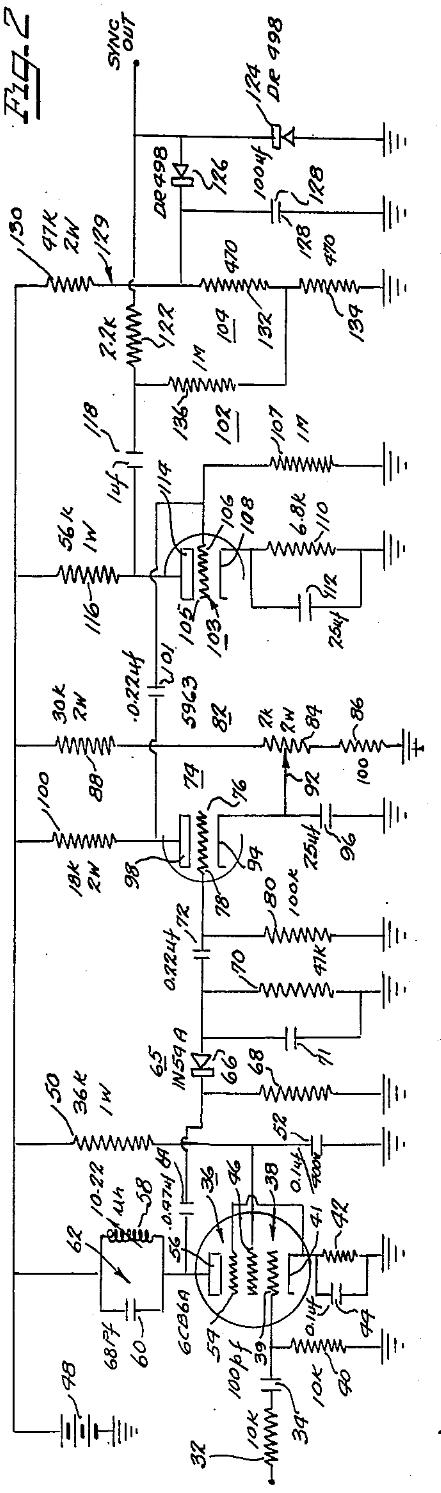
FIGURE 2 is a schematic circuit diagram of a system for obtaining synchronization pulses which may be employed for the sync separator shown in FIGURE 1.

A circuit diagram of an embodiment of the sync separator 20 is shown in FIGURE 2. Generally, the sync separator 20 selectively amplifies the band of frequencies representing each synchronization pulse, detects the amplitude variations of each selected band, and then shapes each detected signal to steepen the rise time thereof and to remove noise therefrom.

As previously indicated, the AM/FM carrier signal at the output of the converter 18 is applied to the input of the sync separator 20. The AM/FM signal (e.g., the waveform shown in FIGURE 3*a*) is coupled through an isolation resistor 32 and a coupling capacitor 34 to a selecting stage 36. The selecting stage 36 is employed to amplify the band of frequencies in the AM/FM signal representing each synchronization pulse and discriminate against the remaining frequencies.

The illustrated stage 36 includes a vacuum tube 38 of the pentode type, the control grid 39 of which is connected to the coupling capacitor 34. A grid leak resistor 40 is connected between the control grid 39 and ground. The grid 39 is biased by connecting the cathode 41 of the tube 38 through a cathode resistor 42 to ground. The cathode resistor 42 is by-passed by a capacitor 44.

The voltage for the screen grid 46 of the tube 38 is provided by a D.-C. power source 48 which is illustrated as a battery, the power source 48 being connected to the screen grid 46 through a screen dropping resistor 50. A.-C. variations at the screen grid are by-passed to ground through a screen by-pass capacitor 52 connected between the screen grid 46 and ground. The suppressor grid 54 of the tube 38 is connected internally to the cathode 41. D.-C. voltage is provided for the plate 56 of the tube 38 by connecting the power supply 48 through a variable inductor 58 to the plate 56.

As shown in FIGURE 2, a capacitor 60 is connected across the inductor 58 to provide a tuned circuit 62 in the plate circuit of the tube 38. The tuned circuit 62 is tuned to be resonant at approximately the frequency in the AM/FM signal representing the tip of each synchronization pulse. Thus, the sync separator stage 36 amplifies a band of frequencies having the frequency representing the tip of each synchronization pulse as a center frequency. In a conventional video recorder/reproducer, the tuned circuit is tuned so as to be resonant at 4.3 megacycles.

The width of the band of frequencies which is amplified by the selecting stage 36 depends upon the selectivity of the tuned circuit 62 which, in turn, depends upon the Q of the circuit (i.e., the ratio of the inductive reactance to the resistance of the tuned circuit). The higher the Q is made, the more selective is the response of the tuned circuit 62.

The illustrated tuned circuit 62 is made with a Q such that the selecting stage 36 discriminates against the component frequencies in the AM/FM signal representing each blanking pulse in the video signal. The ability of the sync selecting stage 36 to discriminate against the blanking pulse frequencies is aided by the amplitude of the blanking pulse frequencies being less than the amplitude of the sync pulse frequencies. Preferably, the tuned circuit is made with a Q value such that the blanking pulse frequencies are attenuated by more than 6 db. In a conventional recorder/reproducer, a Q of between approximately 20 and 50 is employed.

Any noise occurring within the band of frequencies representing each synchronization pulse also is virtually eliminated because of the high Q of the tuned circuit 62. The reason for this is that noise, which may cause improper operation of receiving equipment, has a much lower amplitude than the frequencies representing each synchronization pulse. Such fast changes in amplitude of a frequency within the band of frequencies passed by the tuned circuit are suppressed by the high Q tuned circuit 62. In this connection, the tuned circuit can be thought of as sluggish and suppressing rapid changes, or if preferred, as clipping the side bands, such as those produced by the rapid changes, which are outside the band pass of the tuned circut.

Figure 3:
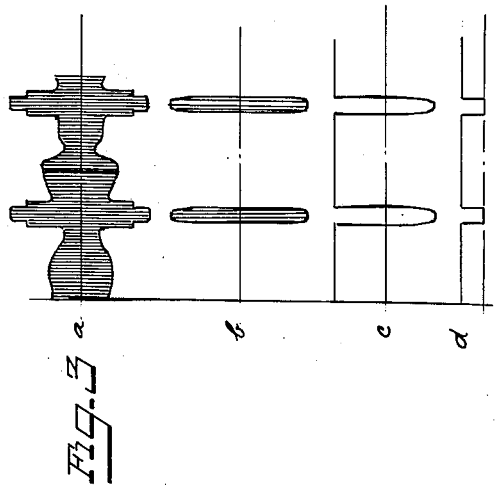
FIGURE 3 is a graph illustrating certain waveforms which occur in the circuit shown in FIGURE 2.

The signal at the plate of the selecting stage 36 is thus a series of opposed positive and negative pulses of a band of frequencies, as shown in FIGURE 3*b*. The pulses correspond with the synchronization pulses in the original composite signal.

As shown in FIGURE 2, the output of the selecting stage 36 is coupled through a coupling capacitor 64 to a detector stage 65 wherein the pulses are rectified and then filtered to remove the band of frequencies. The detector includes a diode 66 directed so as to eliminate the positive pulses. A load resistor 68 for the sync separator stage 36 is connected between the input of the diode 66 and ground.

The negative pulses are developed across a load resistor 70 and the band of frequencies is filtered from the negative pulses by a capacitor 71 connected across the load resistor 70. The output of the detector stage 65 is coupled through a coupling capacitor 72 to a sync clipper stage 74 which removes the portion of each pulse below the amplitude which corresponds to the original pedestal level or blanking pulse.

As shown in FIGURE 2, the sync clipper stage 74 includes a triode tube 76, the grid 78 of which is coupled to the coupling capacitor 72. A grid leak resistor 80 couples the grid 76 to ground. Clipping action is provided in the tube 76 by biasing the grid 78 at such a negative voltage that a portion of the positive swing of the input signal causes the tube 78 to saturate and thereby limit the corresponding swing of the output signal of the tube 76.

In the illustrated embodiment, the grid 78 is biased by a cathode bias network which includes a voltage divider network 82 connected across the power supply 48. The voltage divider network 82 includes a potentiometer 84 with fixed resistors 86 and 88 connected at each end thereof. The movable arm 92 of the potentiometer 84 is connected to the cathode 94 of the tube 76 and the cathode 94, in turn, is coupled to ground by a by-pass capacitor 96. Voltage is provided for the plate 98 of the tube 76 by connecting the power supply 48 through a load resistor 100 to the plate 98.

The clipped pulses at the plate 98 of the tube 78 are coupled through a coupling capacitor 101 to a sync shaping means 102 wherein the rise time of the clipped pulses is improved. Shaping of the clipped pulses is needed because the high Q tuned circuit 62 in the selecting stage 36 causes the separate pulses to have a slow rise and fall near their tips. Normally, such pulses would not be acceptable as synchronization pulses in transmission and other uses.

In the illustrated embodiment, the shaping means 102 include an amplification stage 103 and a clipping stage 104. The illustrated amplification stage 103 includes a triode tube 105, the grid 106 of which is coupled to the coupling capacitor 101. A grid leak resistor 107 is connected between the grid 106 and ground. Grid bias is provided for the tube 105 by connecting the cathode 108 thereof through a cathode resistsor 110 to ground. The cathode resistor 110 is by-passed by a capacitor 112. Plate voltage is provided for the tube 105 by connecting the plate 114 thereof through a plate load resistor 116 to the power supply 48.

The amplified pulses at the plate 114 are coupled through a coupling capacitor 118 to the clipping stage 104. FIGURE 3*c* shows the waveform at the input of the clipping stage 104. The illustrated clipping stage 104 eliminates all but a predetermined portion of the center of the input pulses. Thus, pulses which have a fast rise time and are acceptable for transmission and other uses, are provided at the output of the clipping stage 104.

In the illustrated embodiment, the clipping stage 104 includes an input resistor 122 which is connected between the coupling capacitor 118, and the interconnection between a first diode 124 and a second diode 126. The first diode 124 is connected to ground and is directed so that it has a low resistance to a negative signal at the input. The second diode 126, which is directed so as to have a low resistance to a positive signal at the input, is coupled to ground through a capacitor 128. The capacitor 128 is of a capacitance such that one side thereof is effectively at ground to frequencies of the pulses. The output signal from the clipping stage 104 is taken at the interconnection between the first diode 124 and the second diode 126.

The first and second diodes 124 and 126 are each biased in a reverse direction by a voltage divider network 129 connected across the power supply 48. The voltage divider network 129 includes a series combination of a first, second and third resistors 130, 132 and 134, respectively, the diodes 124 and 126 being connected in series across the second and third resistors 132 and 134. A positive D.-C. voltage is added to the input signal by coupling the interconnection of the second and third resistors 132 and 134 in the voltage divider network 129 through a very high resistance 136 to the input connection to the resistor 122.

Each amplified clipped pulse from the amplifier stage 103 is thus clipped at a predetermined negative value and at a predetermined positive value. Hence, the output from the sync separator 20 is a series of equal amplitude pulses, as shown in FIGURE 3*d*, which have a relatively good rise and fall time. Thus, the output pulses are acceptable for transmission and for use in other apparatus where synchronization pulses have been previously utilized.

The tuned circuit 62 in the sync separator 20 causes a lag in the timing of the output pulses as compared to the original synchronization pulses. Therefore, as previously indicated, the video signal is delayed by the delay line 28 before the output pulses of the sync separator 20 are added thereto. With the tune circuit shown in FIGURE 2, the output pulses of the sync separator 20 are delayed approximately 1.2 microseconds, and therefore the delay line 28 is preferably designed to delay the video signal an equal time.

It should be understood that, while the preferred results are obtained by employing the sync separator to obtain synchronization pulses from an AM/FM signal, the sync separator may also be employed to obtain synchronization pulses from an FM signal in the recording/reproducing apparatus.

From the above it can be seen that synchronization pulses are obtained from a reproduced FM carrier signal by a sync separator which employs relatively few vacuum tubes and circuit components. Hence the sync separator is inexpensive to manufacture and relatively simple to maintain. Moreover, by obtaining the synchronization pulses as described above, noise is substantially eliminated from the pedestal level of the reproduced composite video signal. In addition, the output pulses of the sync separator are obtained without employing clamping circuits. Hence, the pulses are inherently stable and independent of the luminance information in the composite video signal and of spurious noise pulses.

Various changes and modifications may be made in teh above described recording and/or reproducing system without deviating from the spirit or scope of the present invention. Various of the features of the invention are set forth in the accompanying claims.

What is claimed is:

1. A recording and/or reproducing apparatus including a recording medium having recorded thereon a carrier signal which has been frequency modulated by a composite signal, a component signal thereof being represented by a band of one or more frequencies in said frequency modulated carrier signal, comprising means in reproducing relationship with said recording medium for reproducing said recorded frequency modulated carrier signal, a system for obtaining the component signal prior to detection of the reproduced signal, such component signal being delayed by said system, said system comprising means coupled to the output of said reproducing means for selecting the band of frequencies representing said component signal, means coupled to the output of said selecting means for detecting the amplitude variations in the output signal thereof, means coupled to the output of said detecting means for clipping the output signal thereof, means for delaying the clipped signal for a period substantially the same as the delay experienced by the component signal; and means for inserting new signals derived from said component signal obtaining system in the delayed signal and related in time thereto.

2. A video signal recording and/or reproducing apparatus including a recording medium having recorded thereon a carrier signal which has been frequency modulated by a composite video signal, each synchronization pulse in said composite video signal being represented by a band of frequencies in said frequency modulated carrier signal, comprising means in reproducing relationship with said recording medium for reproducing said recorded frequency modulated carrier signal, a system for obtaining said synchronization pulses prior to detection of the reproduced signal, such system providing a delay to said synchronization pulses, said system comprising means coupled to the output of said reproducing means for selecting said band of frequencies representing each synchronization pulse, means coupled to the output of said selecting means for detecting the amplitude variations in the output signal thereof, means coupled to the output of said detecting means for clipping the detected signal at a predetermined level, means for delaying the clipped signal for a period substantially the same as the delay experienced by the synchronization pulses; and means for inserting new signals derived from said synchronization pulse obtaining system having the same frequency as said synchronziation pulses in proper time relationship with said delayed signal.

3. A video signal recording and/or reproducing apparatus including a recording medium having recorded thereon a carrier signal which has been frequency modulated by a composite video signal, each synchronization pulse in said composite video signal being represented by a band of frequencies in said frequency modulated carrier signal, comprising means in reproducing relationship with said recording medium for reproducing said recorded frequency modulated carrier signal, means coupled to the output of said reproducing means for converting the output signal thereof into an AM/FM signal having an amplitude which varies in accordance with its frequency, a system for obtaining said synchronization pulses prior to detection of the reproduced signal, such system providing a delay to said synchronization pulses, said system comprising means coupled to the output of said converting means for selecting said band of frequencies representing each synchronization pulse, means coupled to the output of said selecting means for detecting the amplitude variations in the output signal thereof, means coupled to the output of said detecting means for shaping the output signal thereof, means for delaying the detected signal to compensate for the delay of the synchronization pulses, and means for inserting new signals derived from said synchronization pulse obtaining system into said shaped and delayed signal having the same frequency as said synchronization pulses.

4. A video signal recording and/or reproducing apparatus including a recording medium having recorded thereon a carrier signal which has been frequency modulated by a composite video signal, each synchronization pulse in said composite video signal being represented by a band of frequencies in said frequency modulated carrier signal, comprising means in reproducing relationship with said recording medium for reproducing said recorded frequency modulated carrier signal, a system for obtaining said synchronization pulses prior to detection of the reproduced signal, such system providing a delay to said synchronization pulses, said system comprising means coupled to the output of said reproducing means for selecting said band of frequencies representing each synchronization pulse, means coupled to the output of said selecting means for detecting the amplitude variations in the output signal thereof, means coupled to the output of said detecting means for shaping the output signal thereof, said selecting means including a high Q tuned circuit across which said frequency modulated carrier signal is applied, said tuned circuit being resonant at approximately the frequency of the band of frequencies representing the tip of each synchronization pulse, means for delaying the detected signal to compensate for the delay of the synchronization pulses, and means for inserting new signals derived from said synchronization pulse obtaining system into said shaped and delayed signal having the same frequency as said synchronization pulses.

5. A video signal recording and/or reproducing apparatus including a recording medium having recorded thereon a carrier signal which has been frequency modulated by a composite video signal, each synchronization pulse in said composite video signal being represented by a band of frequencies in said frequency modulated carrier signal, comprising means in reproducing relationship with said recording medium for reproducing said recorded frequency modulated carrier signal, means coupled to the output of said reproducing means for converting the output signal thereof into an AM/FM signal having an amplitude which varies in accordance with its frequency, a system for obtaining said synchronization pulses prior to detection of the reproduced signal, such system providing a delay to said synchronization pulses, said system comprising means coupled to the output of said converting means for selecting said band of frequencies representing each synchronization pulse, means coupled to the output of said selecting means for detecting the amplitude variations in the output signal thereof, means coupled to the output of said detecting means for shaping the output signal thereof, said selecting means including an amplifier stage having a high Q tuned circuit in the plate circuit thereof, said tuned circuit being resonant at approximately the frequency representing the tip of each synchronization pulse, means for delaying the detected signal to compensate for the delay of the synchronization pulses, and means for inserting new signals derived from said synchronization pulse obtaining system into said shaped and delayed signal having the same frequency as said synchronization pulses.

6. A video signal recording and/or reproducing apparatus including a magnetic tape having recorded thereon a carrier signal which has been frequency modulated by a composite video signal, each synchronization pulse in said composite video signal being represented by a band of frequencies in said frequency modulated carrier signal, comprising means in reproducing relationship with said magnetic tape for reproducing said recorded frequency modulated carrier signal, means coupled to the output of said reproducing means for converting the output signal thereof into an AM/FM signal having an amplitude which varies in accordance with its frequency, a system for obtaining said synchronization pulses prior to detection of the reproduced signal, such system providing a delay to said synchronization pulses, said system comprising a sync selecting stage which includes a high Q tuned circuit in the plate circuit thereof, said tuned circuit being resonant at about the frequency representing the tip of each synchronization pulse, a detector stage coupled to the output of said amplifier stage for detecting the amplitude variations in the output signal thereof, a clipping stage coupled to the output of said detector stage for clipping the output signal thereof up to approximately the amplitude corresponding to the base of each synchronization pulse, a shaping stage coupled to the output of said clipping stage for amplifying the output signal thereof and clipping the amplified signal at predetermined amplitude levels, means for delaying the detected signal to compensate for the delay of the synchronization pulses, and means for inserting new signals derived from said synchronization pulse obtaining system into said shaped and delayed signal having the same frequency as said synchronization pulses.

7. An electronic network for processing a frequency modulated composite video signal having blanking and synchronizing signals recorded on a magnetic medium comprising: means for deriving said video signal from said medium as an electrical signal; means for separating said blanking and synchronizing signals from said composite video signal prior to demodulation of the composite signal, such separating means providing a delay to the separated signals; detection means for demodulating said video signal; means for clipping said demodulated video signal; a blanking generator coupled between, the output of said separating means and the output of said clipping means for inserting new blanking pulses in proper time relationship with said clipped video signal; means for delaying said video signal for a period compensating for the delay of the separated signals coupled to the output of said clipping means; and means for adding new synchronizing pulses derived from the output of said separating means to said delayed video signal in proper time relationship.

References Cited in the file of this patent

UNITED STATES PATENTS

| | | |
|---|---|---|
| 2,293,233 | Wheeler | Aug. 18, 1942 |
| 2,435,736 | Carnahan | Feb. 10, 1948 |
| 2,481,902 | Bradley | Sept. 13, 1949 |
| 2,979,558 | Leyton | Apr. 11, 1961 |
| 3,005,869 | Dolby | Oct. 24, 1961 |